United States Patent [19]

Hower, Jr. et al.

[11] Patent Number: 5,467,182
[45] Date of Patent: Nov. 14, 1995

[54] SHEET TRANSPORT FOR HIGH PRODUCTIVITY TRAYLESS DUPLEX

[75] Inventors: John D. Hower, Jr., Fairport; Kathleen M. Martin, Hamlin; John D. Gramlich, Webster; LeRoy A. Baldwin, Rochester, all of N.Y.

[73] Assignee: Xerox Corporation, Stamford, Conn.

[21] Appl. No.: 342,289

[22] Filed: Nov. 18, 1994

[51] Int. Cl.$^6$ .................................................. G03G 21/00
[52] U.S. Cl. .......................... 355/319; 355/24; 271/182
[58] Field of Search ................................... 355/319, 318, 355/308, 309, 23, 24, 208, 77, 316; 271/291, 301, 293, 182, 183

[56] References Cited

U.S. PATENT DOCUMENTS

| | | | |
|---|---|---|---|
| 4,459,013 | 7/1984 | Hamlin et al. | 355/23 |
| 4,519,700 | 5/1985 | Barker et al. | 355/3 |
| 4,660,963 | 4/1987 | Stemmle | 355/24 |
| 4,918,490 | 7/1989 | Stemmle | 355/318 |
| 5,095,342 | 3/1992 | Farrell et al. | 355/319 |
| 5,159,395 | 10/1992 | Farrell et al. | 355/319 |
| 5,184,185 | 2/1993 | Rasmussen et al. | 355/308 |
| 5,327,206 | 7/1994 | Ueda et al. | 355/319 X |
| 5,337,135 | 8/1994 | Malachowski et al. | 355/319 |

*Primary Examiner*—R. L. Moses
*Attorney, Agent, or Firm*—Kevin R. Kepner

[57] ABSTRACT

A duplex path loop having a acceleration nip cooperating with a belt transport and retime nip to allow duplexing of sheets while minimizing skipped pitches on the photoreceptor. As each sheet to be duplex printed is removed from the process path after first side imaging it is accelerated to create a gap between it and subsequent sheets. The sheet is then stalled or slowed in a retime nip, while subsequent sheets to be duplexed are simultaneously driven by the same transport, the first mentioned sheet being reinserted into the process path at the proper time for receiving the second side image before the arrival of the second sheet at the retime nip. Subsequent duplex sheets are handled in the same manner so that duplex copies are interleaved or otherwise reinserted into the process path with first side copies so that skipped pitches on the photoreceptor are minimized.

11 Claims, 2 Drawing Sheets

SHEET TRANSPORT FOR HIGH PRODUCTIVITY TRAYLESS DUPLEX

This invention relates generally to a sheet transport device, and more particularly concerns a system for printing of duplex (printed on both sides) copy sheets with a buffer loop (endless loop) duplexing path which provides more efficient duplexing of multipage collated jobs with reduced skipped printer pitches, for more closely spaced or continuous production of duplex copy sheets with relatively simple and inexpensive machine paper path modifications, and while remaining fully compatible with normal printing of simplex (one side printed) sheets in the same printing apparatus.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In printing machines such as those described above, where input page imaging and printing on both sides of the copy sheets (duplex printing) is provided, it is important to try to fill every available imaging panel or pitch space on the photoreceptor in order to maintain a constant copy output and the highest possible machine productivity. It is desirable to provide duplexing systems using trayless duplex buffer loop technology, even for smaller and less expensive printers. Eliminating a conventional intermediate sheet stacking duplexing buffer tray, and its re-separating feeder, eliminates sheet jams and jam clearances associated therewith. It eliminates the sheet feeder/separator hardware and the space it requires as well as associated hardware such as sheet stackers, edge joggers, set separators, bail bars, and tray edge guide resetting means for different sheet sizes. Sheet waste due to discarded unfinished duplex sheets in a machine jam situation is also minimized with a trayless duplex approach.

It is therefore desirable to provide a system in which the printer does not normally have to wait (skip one or more copying pitches) for the time required to turn over and return to the transfer station a copy sheet for copying its other side in the desired sequence, yet collation of the copy sheets is provided at their output.

The following disclosures may be relevant to various aspects of the present invention:

U.S. Pat. No. 5,337,135 Inventor: Malachowski et al. Issue Date: Aug. 9, 1994

U.S. Pat. No. 5,184,185 Inventor: Farrell, et al. Issue Date: Feb. 2, 1993

U.S. Pat. No. 5,159,395, Inventor: Farrell, et al. Issue Date: Oct. 27, 1992

U.S. Pat. No. 5,095,342 Inventor: Farrell, et al. Issue Date: Mar. 10,1992

U.S. Pat. No. 4,918,490 Inventor: Stemmle Issue Date: Apr. 17, 1990

U.S. Pat. No. 4,660,963 Inventor: Stemmle Issue Date: Apr. 28, 1987

U.S. Pat. No. 4,519,700 Inventor: Barker, et al. Issue Date: May 28, 1985

U.S. Pat. No. 4,459,013 Inventor: Hamlin, et al. Issue Date: Jul. 10, 1984

The relevant portions of the foregoing disclosures may be briefly summarized as follows:

U.S. Pat. No. 5,337,135 discloses a printing system having a high productivity trayless duplex printer with a duplex loop having a variable path velocity. The duplex path is provided with a variable speed duplex drive for driving a major portion of the duplexing path sheet feeders to at least two different sheet feeding speeds so as to avoid skipped pitches.

U.S. Pat. No. 5,184,185 describes a printer in which gaps which naturally exist in the output of printed copy sheets from a duplex paper path due to duplex printing are selectably combined with inner set interval skipped pitches so as to provide an appropriate interset interval between each set of printed copy sheets while minimizing the number of skipped pitches which actually need to be scheduled.

U.S. Pat. No. 5, 159,395 discloses a method of scheduling copy sheets in a dual mode duplex printing system in which the scheduling is selectably conducted in one of a first mode where for each set of copy sheets to be printed the copy sheets are consecutively outputted from the copy sheet paper path without any skipped pitches between each consecutively outputted copy sheet and a second mode where for each set of copy sheets to be printed the copy sheets are output from the copy sheet paper path with skipped pitches between at least some of the consecutively outputted copy sheets. The second mode results in copy sheets being outputted from the imaging device at a lower frequency than in the first mode.

U.S. Pat. No. 5,095,342 discloses a method for scheduling sheets in an imaging system having an endless duplex paper path loop. The method involves consecutively inserting copy sheets to be imaged into the duplex loop without placing any skipped pitches therebetween regardless of set or job boundaries. Duplex side ones from subsequent sets or jobs are used to fill any gaps in the duplexed side one sheet stream of earlier sets or jobs.

U.S. Pat. No. 4,918,490 discloses a system for printing collated sets of duplexed copy sheets from a multipage job set of electronically reorderable page images electronically set to the printer in ascending serial page order. The job sets are sequentially electronically divided into batches as the page images are received with consecutive batches containing page images in ascending serial page order, with each batch containing a small number of page images approximately twice the copy sheet length of the trayless duplexing path and reordering the page images within each batch for collated duplex printing utilizing the duplexing buffer loop. The copy sheets are printed one batch at a time, the first sides of one batch of copy sheets with alternate pages of one page imaged batch, and then printing the other sides with the remaining page images of that batch prior to printing any page images from any other batch and consecutively repeating this process for subsequent batches to produce a collated, duplexed copy set from a multipage job set.

U.S. Pat. No. 4,660,963 discloses an interval removable duplex module for use in conjunction with a reproduction processor, including two paper trays, a first operable as a duplex copy buffer tray or paper tray, and a second operable as an auxiliary paper tray. The papers entering the module may be directed to either the duplex copy buffer tray or a trayless path which passes copy sheets directly back to the processor, a method for operating the duplex module is described to efficiently use the trayless path by directing copy sheets thereto depending upon the number of copies to be made. Accordingly, copy sheets may be directed to the duplex tray or trayless path at various times during any run.

U.S. Pat. No. 4,519,700 describes a timing mechanism for an image transfer device in which the position of a sheet is sensed and the sheet position is compared with and matched to the image position on a photoreceptive member. The sheet is fed in registry and timed relation to the member for image transfer.

U.S. Pat. No. 4,459,013 discloses a copying system for copying either duplex or simplex original document sets as precollated copy sets utilizing a document handling system providing selective automatic recirculative precollation copying of either duplex or simplex document sheets, with selective automatic sheet inversion.

In accordance with one aspect of the present invention, there is provided a sheet feeding apparatus for feeding cut sheets in timed relationship. The apparatus comprises a first sheet drive, a second sheet drive adjacent the first drive so that a sheet is fed from the first drive and then controlled by the second drive, and a timing mechanism adjacent the second drive to sequence the copy sheet into a process path, the second drive positively driving the sheet to the timing mechanism and then slipping relative to the sheet while simultaneously driving a second sheet toward the timing mechanism so that the speed of the first sheet is altered so that it is fed in the proper timed relation into the process path.

Pursuant to another aspect of the present invention, there is provided an electrophotographic printing machine having a given sheet printing rate in which copy sheets are selectively printed in a duplex mode having printed image data printed on both sides of a sheet having a trayless, high-productivity duplex path for transporting a sheet having an image on one side of the sheet from an output portion of a process path back into the process path to have a second image transferred to the second side thereof. The duplex path comprises a first sheet drive adjacent the output portion of the process path operating at a speed substantially higher than the sheet printing rate and a second sheet drive adjacent the first drive operating at a speed substantially equal to the sheet printing rate so that a copy sheet is accelerated from the process path into the duplex path and then controlled by the second drive. A timing mechanism adjacent the second drive to sequence the copy sheet into the process path to the transfer station to complete duplex printing, the second drive positively driving the sheet to the timing device and then slipping relative to the sheet while driving a second sheet toward the-timing device so that the speed of the first sheet is altered to achieve proper reimage timing and the first sheet is then forwarded into the process path is also provided.

Pursuant to yet another aspect of the invention, there is provided a method for duplex printing utilizing a duplex loop. The method comprises accelerating a first sheet having an image on a first side thereof out of a process path into a duplex path loop and transporting the first sheet to a timing mechanism for reinsertion into the process path. The steps of positively driving a second sheet toward the timing mechanism with a transport mechanism while the first sheet simultaneously slips with respect to the transport mechanism while captured within the timing mechanism and reinserting the first sheet into the process path before the second sheet reaches the timing mechanism are also provided.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
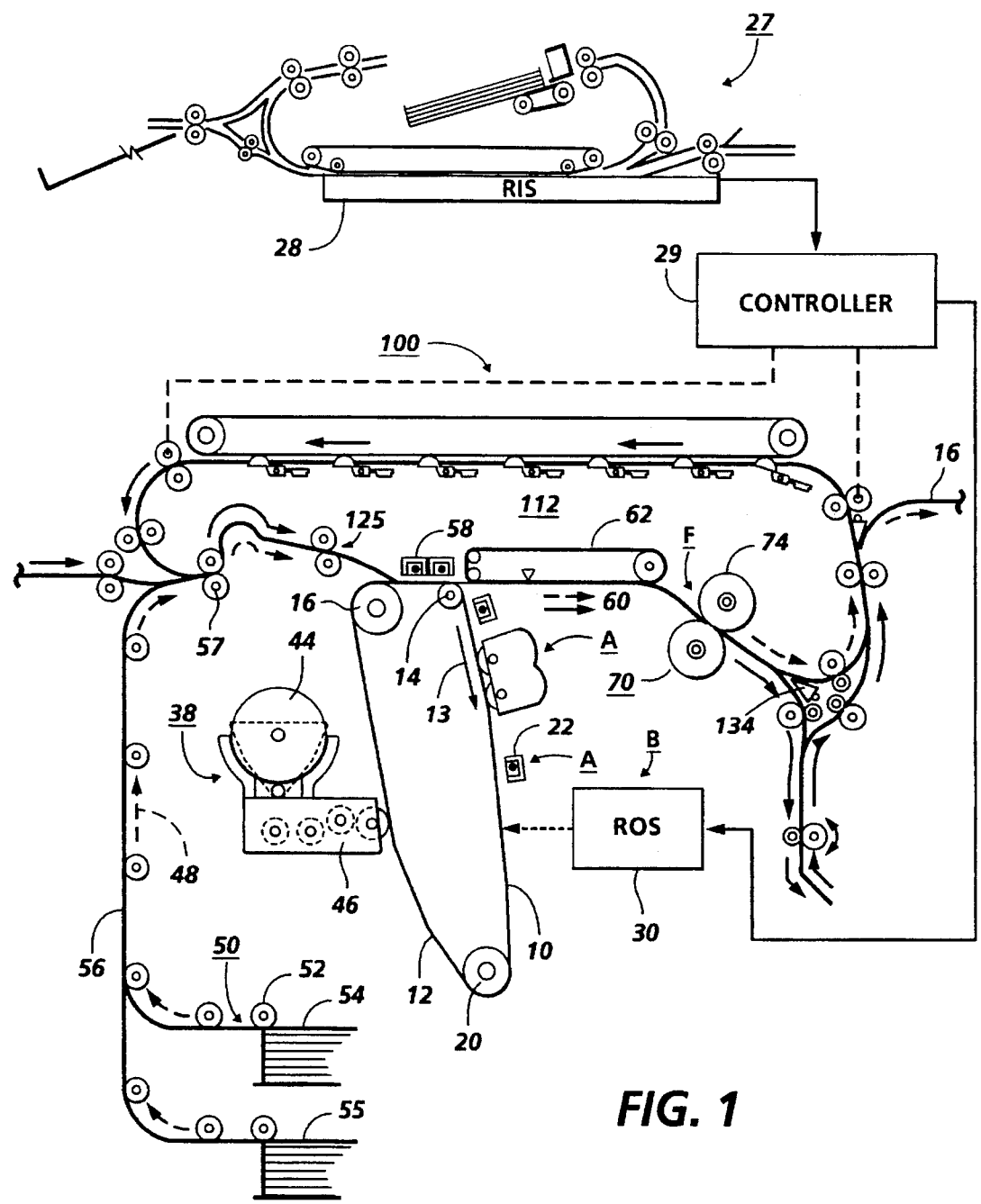
FIG. 1 is a is an elevational view of the of one example of the endless loop duplex path of the present invention, which is part of an exemplary duplex printer.

For a general understanding of the features of the present invention, reference is made to the drawings. In the drawings, like reference numerals have been used throughout to identify identical elements. FIG. 1 schematically depicts an electrophotographic printing machine incorporating the features of the present invention therein. It will become evident from the following discussion that the duplex loop path of the present invention may be employed in a wide variety of devices and is not specifically limited in its application to the particular embodiment depicted herein.

Referring to FIG. 1 of the drawings, an original document is positioned in a document handler 27 on a raster input scanner (RIS) indicated generally by reference numeral 28. The RIS contains document illumination lamps, optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) described below.

FIG. 1 schematically illustrates an electrophotographic printing machine which generally employs a photoconductive belt 10. Preferably, the photoconductive belt 10 is made from a photoconductive material coated on a ground layer, which, in turn, is coated on an anti-curl backing layer. Belt 10 moves in the direction of arrow 13 to advance successive portions sequentially through the various processing stations disposed about the path of movement thereof. Belt 10 is entrained about stripping roller 14, tensioning roller 16 and drive roller 20. As roller 20 rotates, it advances belt 10 in the direction of arrow 13.

Initially, a portion of the photoconductive surface passes through charging station A. At charging station A, a corona generating device indicated generally by the reference numeral 22 charges the photoconductive belt 10 to a relatively high, substantially uniform potential.

At an exposure station, B, a controller or electronic subsystem (ESS), indicated generally by reference numeral 29, receives the image signals representing the desired output image and processes these signals to convert them to a continuous tone or greyscale rendition of the image which is transmitted to a modulated output generator, for example the raster output scanner (ROS), indicated generally by reference numeral 30. Preferably, ESS 29 is a self-contained, dedicated minicomputer. The image signals transmitted to ESS 29 may originate from a RIS as described above or from a computer, thereby enabling the electrophotographic printing machine to serve as a remotely located printer for one or more computers. Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. Preferably, a nine facet polygon is used. The ROS illuminates the charged portion of photoconductive belt 10 at a resolution of about 300 or more pixels per inch. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 1, after the electrostatic latent image is developed, the toner powder image present on belt 10 advances to transfer station D. A print sheet 48 is advanced to the transfer station, D, by a sheet feeding apparatus, 50. Preferably, sheet feeding apparatus 50 includes a feed roll 52 contacting the uppermost sheet of stack 54. Feed roll 52 rotates to advance the uppermost sheet from stack 54 into vertical transport 56. Vertical transport 56 directs the advancing sheet 48 of support material into registration transport 57 past image transfer station D to receive an image from photoreceptor belt 10 in a timed sequence so that the toner powder image formed thereon contacts the advancing sheet 48 at transfer station D. Transfer station D includes a corona generating device 58 which sprays ions onto the back side of sheet 48. This attracts the toner powder image from photoconductive surface 12 to sheet 48. After transfer, sheet 48 continues to move in the direction of arrow 60 by way of belt transport 62 which advances sheet 48 to fusing station F.

Fusing station F includes a fuser assembly indicated generally by the reference numeral 70 which permanently affixes the transferred toner powder image to the copy sheet. Preferably, fuser assembly 70 includes a heated fuser roller 72 and a pressure roller 74 with the powder image on the copy sheet contacting fuser roller 72. The pressure roller is cammed against the fuser roller to provide the necessary pressure to fix the toner powder image to the copy sheet. The fuser roll is internally heated by a quartz lamp (not shown). Release agent, stored in a reservoir (not shown), is pumped to a metering roll (not shown). A trim blade (not shown) trims off the excess release agent. The release agent transfers to a donor roll (not shown) and then to the fuser roll 72.

The sheet then passes through fuser 70 where the image is permanently fixed or fused to the sheet. After passing through fuser 70, a gate 80 either allows the sheet to move directly via output 16 to a finisher or stacker, or deflects the sheet into the duplex path 100, specifically, first into single sheet inverter 82 here. That is, if the sheet is either a simplex sheet, or a completed duplex sheet having both side one and side two images formed thereon, the sheet will be conveyed via gate 80 directly to output 16. However, if the sheet is being duplexed and is then only printed with a side one image, the gate 80 will be positioned to deflect that sheet into the inverter 82 and into the duplex loop path 100, where that sheet will be inverted and then fed to acceleration nip 102 and belt transports 110, described in further detail below, for recirculation back through transfer station D and fuser 70 for receiving and permanently fixing the side two image to the backside of that duplex sheet, before it exits via exit path 16.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the nontransferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

The various machine functions are regulated by controller 29. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc.. The control of all of the exemplary systems heretofore described may be accomplished by conventional control switch inputs from the printing machine consoles selected by the operator. Conventional sheet path sensors or switches may be utilized to keep track of the position of the document and the copy sheets.

Figure 2:
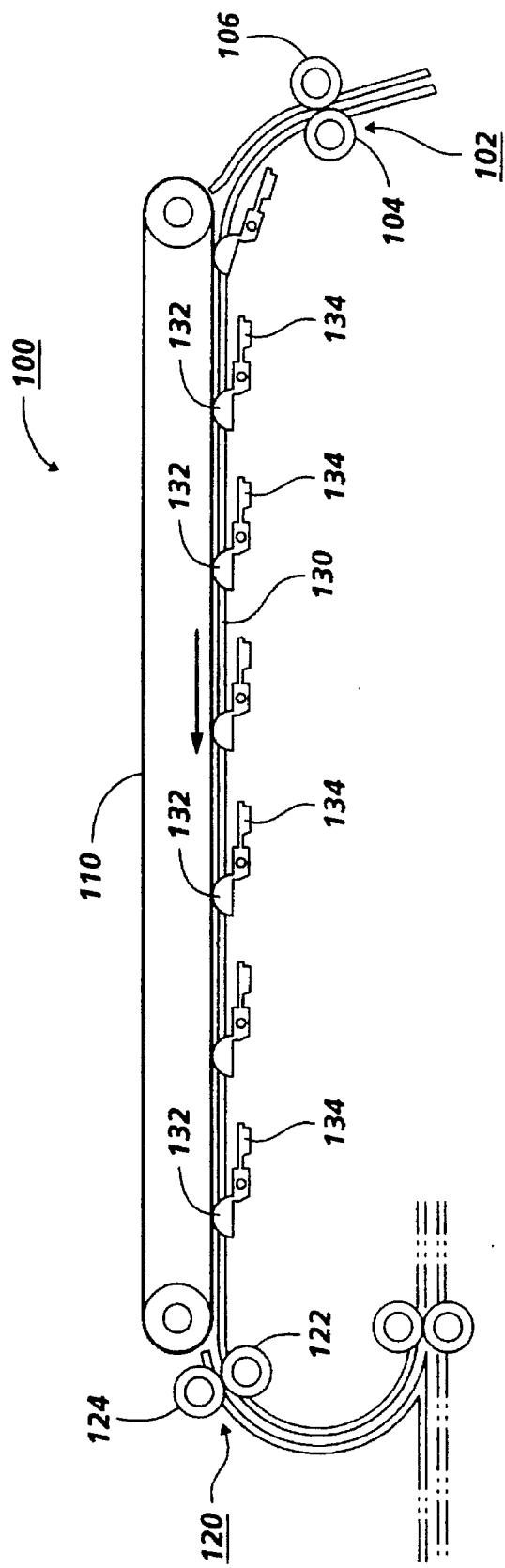
FIG. 2 is an isolated view of the duplex path of FIG. 1.

Turning now to FIG. 2, there is illustrated a detailed elevational view of the high productivity duplex path 100 of the present invention. The duplexing path includes an acceleration drive nip 102, which is made up of a drive roll 106 and an idler roll 104, which initially forwards a sheet from the process path into the duplex path at a speed substantially higher than the process speed of the printing machine. The sheet then moves along into the duplex path where it is transported by belt transport 110 from the acceleration nip to the retime nip 120. There are biased load cells 130 located along the path to maintain the sheet in contact with belt transport 110 as the sheet moves from the acceleration nip to the retime nip. The load cells are freewheeling rotating balls 132 or idlers which contact the previously imaged first side of the sheet. The load cells 130 are biased by a weight 134 or spring so that the idler end 132 is urged into contact with the belt portion 112 of belt transport 110. The belt transport 110 contacts the blank second side of the sheet to be imaged. Once the sheet reaches the retime nip 120 it is stalled and the belt transport 110 continues to drive the sheet but slips against the backside of the sheet. The load cells 130 allow the sheet to stall without damaging or smearing the previously imaged first side.

Meanwhile, a second sheet for duplexing is accelerated by the acceleration nip 102 out of the process path and into the belt transport 110 of the duplex path. As the second sheet approaches the retime nip 120, the retime nip is actuated by a clutch mechanism 122 under the control of the machine controller 29 to forward the first sheet back into the process path ahead of the transfer station D for subsequent transfer of the duplex image to the second side of the sheet. The second sheet is then stalled in the retime nip 120 until properly timed for duplexing. Thus, the slip transport in the duplex path allows a one-sided copied sheet to be transported out of the process path, accelerated, and then stalled for timing purposes while still allowing a second and subsequent sheets to be duplexed to follow the same route to allow for maximum productivity for duplex copying. The sheet is then reinserted into the process path in an interleaved manner or otherwise inserted with other sheets having images transferred to the first side thereof. In this manner, there is no need for skipped pitches on the photoreceptor to allow for the delay in the duplex path for the second sided copying of each sheet.

As a result of the belt transport being allowed to slip against the backside of a copy sheet, there is no need for a complicated variable speed duplex path as a result of the invention herein. Only one extra acceleration nip which creates a spacing between sheets to be duplexed by accelerating a sheet out of the process path and into the duplex path at which the sheet is then slowed back down to substantially the process speed, stalled, and timed back into the process path for subsequent transfer of the second side image. As a result of the slip mechanism, one sheet can be stalled in the retime nip while a second sheet is accelerated out of the process path and into the duplex path where it is forwarded towards the retime nip and then stalled after the first sheet is fed back into the process path.

While the invention herein has been described in the context of a trayless duplex loop it will be readily apparent that the transport can be utilized in any sheet feeding situation which requires sheets to be delivered in a timed relationship.

In recapitulation, there is provided a duplex path loop having a acceleration nip cooperating with a belt transport and retime nip to allow duplexing of sheets while minimizing skipped pitches on the photoreceptor. As each sheet to be duplex printed is removed from the process path after first side imaging it is accelerated to create a gap between it and subsequent sheets. The sheet is then stalled in a retime nip, while subsequent sheets are simultaneously driven by the same transport, and reinserted into the process path at the proper time for receiving the second side image. Subsequent duplex sheets are handled in the same manner so that duplex copies are interleaved into the process path with first side copies so that skipped pitches on the photoreceptor are minimized.

It is, therefore, apparent that there has been provided in accordance with the present invention, a high productivity trayless duplex loop that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A sheet feeding apparatus for feeding cut sheets in timed relationship comprising:

a first sheet drive;

a second sheet drive adjacent said first drive so that a sheet is fed from said first drive and then controlled by said second drive;

a timing mechanism adjacent said second drive to sequence the copy sheet into a process path, said second drive positively driving the sheet to said timing mechanism and then slipping relative to the sheet while simultaneously driving a second sheet toward said timing mechanism so that the speed of the first sheet is altered so that it is fed in the proper timed relation into the process path.

2. An apparatus as in claim 1 wherein said first sheet drive comprises:

a drive roll;

a member in circumferential contact with said drive roll to form a drive nip therewith.

3. An apparatus according to claim 2 wherein said second sheet drive comprises:

a transport belt that contacts a first side of a sheet and transports the sheet frictionally to said timing device;

an idler, contacting said transport belt to maintain the sheet in contact with said transport belt.

4. An apparatus according to claim 3 wherein said timing mechanism comprises:

a second drive roll;

a member in circumferential contact with said second drive roll so as to form a drive nip therewith, the nip capturing the sheet and stopping the sheet thereat; and an actuator mechanism, attached to said second drive roll to activate said second drive roll to properly time the copy sheet.

5. An apparatus according to claim 4 wherein said actuator comprises:

a clutch connected to said second drive roll; and a controller which sends a timing signal to said clutch so that the copy sheet is transported at the proper time.

6. An electrophotographic printing machine having a given sheet printing rate in which copy sheets are selectively printed in a duplex mode having printed image data printed on both sides of a sheet having a trayless, high-productivity duplex path for transporting a sheet having an image on one side of the sheet from an output portion of a process path back into the process path to have a second image transferred to the second side thereof, comprising:

a first sheet drive adjacent the output portion of the process path operating at a speed substantially higher than the sheet printing rate;

a second sheet drive adjacent said first drive operating at a speed substantially equal to the sheet printing rate so that a copy sheet is accelerated from the process path into the duplex path and then controlled by said second drive;

a timing mechanism adjacent said second drive to sequence the copy sheet into the process path to the transfer station to complete duplex printing, said second drive positively driving the sheet to the timing mechanism and then slipping relative to the sheet while simultaneously driving a second sheet toward the timing mechanism so that the speed of the first sheet is altered to achieve proper reimage timing and the first sheet is then forwarded into the process path.

7. A printing machine as in claim 6 wherein said first sheet drive comprises:

a drive roll;

a member in circumferential contact with said drive roll to form a drive nip therewith.

8. A printing machine according to claim 7 wherein said second sheet drive comprises:

a transport belt, located in the duplex path so that said transport belt contacts the non-imaged side of a sheet and transports the sheet frictionally to said timing device;

an idler, located in the duplex path contacting said transport belt to maintain the sheet in contact with said transport belt.

9. An apparatus according to claim 8 wherein said timing mechanism comprises:

a second drive roll;

a member in circumferential contact with said second drive roll so as to form a drive nip therewith, the nip capturing the copy sheet and stopping the sheet thereat; and an actuator mechanism, attached to said second drive roll to activate said second drive roll to properly time the copy sheet into the process path for imaging on the second side thereof.

10. An apparatus according to claim 9 wherein said actuator comprises:

a clutch connected to said second drive roll; and a controller which sends a timing signal to said clutch so that the copy sheet is transported into the process path at the proper time to have the second side image transferred thereto.

11. A method for duplex printing utilizing a duplex loop, comprising:

accelerating a first sheet having an image on a first side thereof out of a process path into a duplex path loop;

transporting the first sheet to a timing mechanism for reinsertion into the process path;

positively driving a second sheet toward the timing mechanism with a transport mechanism while the first sheet simultaneously slips with respect to the transport mechanism while captured within the timing mechanism; and reinserting the first sheet into the process path before the second sheet reaches the timing mechanism.

* * * * *